March 14, 1961  A. GHINAZZI  2,974,409
DRIVE MEANS FOR ELECTRIC CAN OPENERS AND THE LIKE
Filed Sept. 21, 1959
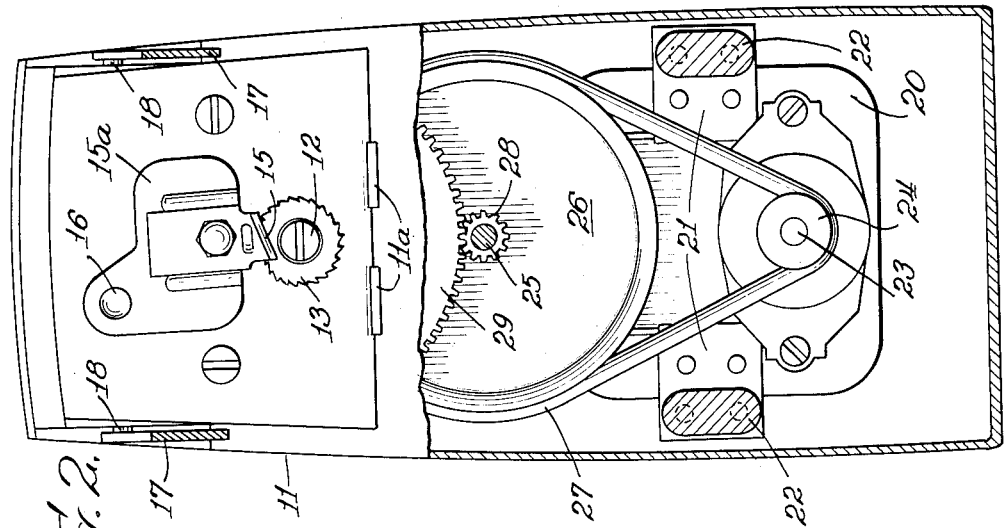
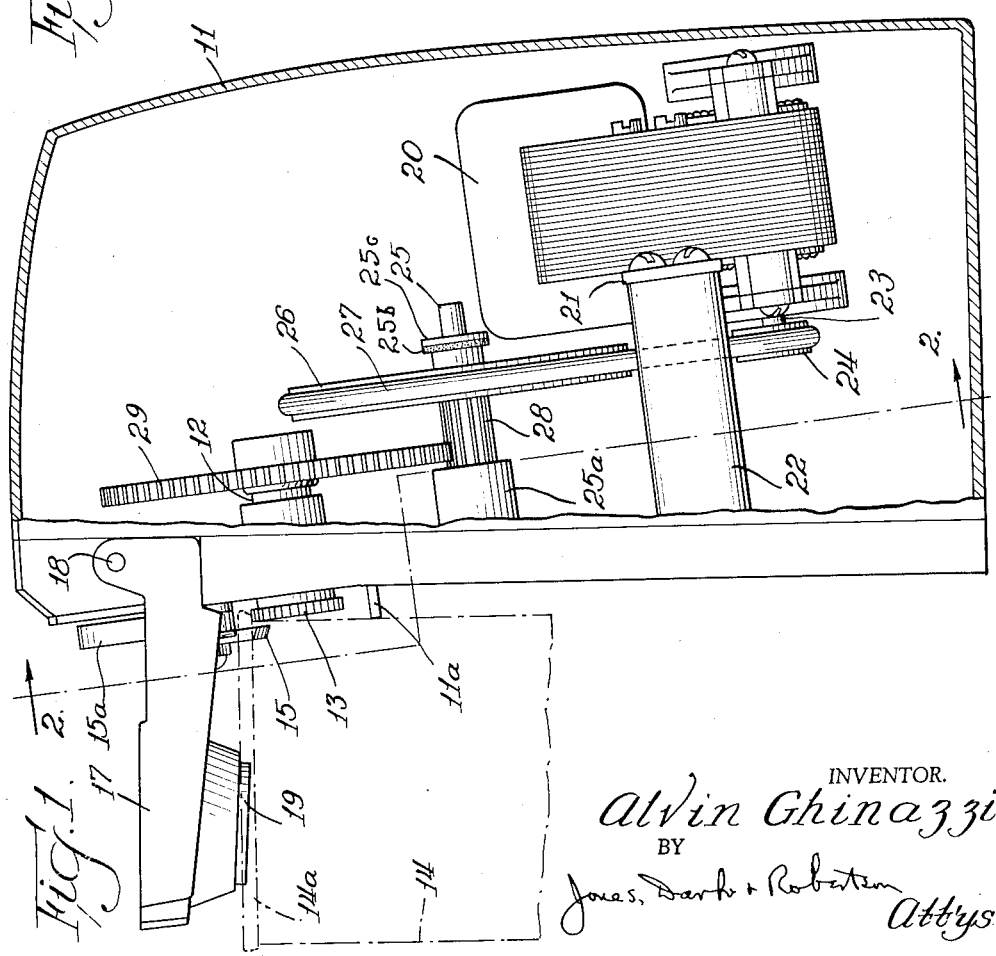
INVENTOR.
Alvin Ghinazzi
BY
Jones, Bark + Robertson
Attys.

United States Patent Office 2,974,409
Patented Mar. 14, 1961

2,974,409
DRIVE MEANS FOR ELECTRIC CAN OPENERS AND THE LIKE

Alvin Ghinazzi, South Beloit, Ill., assignor to Burgess Vibrocrafters, Inc., Grayslake, Ill., a corporation of Delaware Filed Sept. 21, 1959, Ser. No. 841,084
2 Claims. (Cl. 30—4)

This invention relates to electric motivation and transmission means for apparatus having high load starting requirements and employing a shaded pole type electric motor.

The shaded pole type of electric motor is extremely advantageous from the commercial standpoint because it may be manufactured at considerably lower cost than other motors capable of delivering comparable torque at full rated speeds. However, the low starting torque characteristics of the shaded pole type of motor is a serious shortcoming which either disqualifies it for particular applications or requires use of a size considerably in excess of that required for operation at normal speed. An objective of this invention is to provide a transmission for delivering power from a shaded pole type of electric motor and which enables the motor to start and attain some speed to thereby increase the torque which it is capable of delivering prior to application of the full load of the apparatus with which the transmission is connected. The transmission system is particularly advantageous in connection with apparatus which requires only modest power for operation but a relatively high torque for starting.

A typical example of apparatus which requires high torque for starting and relatively low torque for operation thereafter is an electric can opener wherein the initial piercing of the lid of the can, as well as the cutting of the lid from the can, is accomplished by power means rather than manually. Accordingly, for a disclosure of the invention with reference to a typical application, it will be described and claimed in connection with electric can openers.

Another problem and coordinate advantage of the invention relates to noise considerations. In Patent No. 2,803,057 to Ralph I. Meader, dated August 20, 1957, there is described an electric can opener embodying a toothed can turning wheel and an electric motor for driving the latter through speed-reduction gearing. In practice, two stages of power transmission have heretofore been employed, a first stage including a relatively large diameter intermediate gear, and a second stage including a pinion affixed to or driven by the intermediate gear and meshing with another relatively large gear fixed on the shaft of the can turning wheel for rotating the latter. Since the lid of a can to be opened was first pierced and then cut from the can by power from the motor, a motor large enough to overcome the high piercing load was necessarily employed. The high speed and low torque gearing of the first transmission stage, normally employing mass-produced gears with relatively broad tolerances, has been found to cause a shrill noise or high-pitched whine that is highly disagreeable to a housewife using the can opener in her kitchen for example. Thus the Meader can opener, although operable and highly useful, left room for improvement with respect to powering and silencing.

A principal object of the invention, in its broadest aspects, is to provide a transmission for use with a shaded pole type of electric motor which defers application to the motor of the full starting load of the apparatus to be driven by the motor and transmission until after the motor has attained some speed. In a narrower aspect, an object of the invention is to provide an electric can opener of the type which pierces as well as cuts the lid from the can by power means wherein the driving means comprises a transmission of the type above referred to and a relatively small and low cost motor of the shaded pole type. Another object is to provide electric motor drive means for apparatus, such as an electric can opener, requiring the application of torque of substantial magnitude wherein the transmission comprises a first stage of belt and pulley type and a positive drive second stage adapted to operate efficiently with low speed and high torque.

The foregoing objects and advantages will be apparent from the following description, taken together with the accompanying drawing, showing an illustrative embodiment of the invention, and in which drawing:

Fig. 1 is a side elevational view, partly in section, of an electric can opener device to which the present invention is applicable, the upper portion of a can, being opened being shown diagrammatically by dot-and-dash lines, and Fig. 2 is a front elevational view of the structure of Fig. 1 with the can omitted, the device being shown partly in section.

Referring in detail to the illustrative construction shown in the drawings, the housing 11 has journaled therein, near the top thereof, shaft 12 of a can turning wheel 13 that is exposed on the front face of the housing 11. The wheel 13 is toothed and in practice engages underneath the top bead 14a of a can 14 to be opened, and, in cooperation with the cutting blade 15 and associated structure which holds the can 14 against the wheel 13, supports the can and turns it while its lid is being cut out. Projections 11a on the face of the housing assist in properly supporting the can. Wheel 13 causes rotation of the can by rotation of the wheel. Cutting blade 15 is carried by blade support 15a pivoted on the front face of the housing at 16. An operating handle 17 pivoted on the housing 11 at 18, transversely to the pivot 16 of the blade support 15a, carries a magnet 19 for picking up the can lid after it has been cut off. The blade support 15a is pivotally mounted at 16 so as to swing toward and away from the can top, the handle 17 being operatively connected as by a lost-motion connection with the blade support 15a to lower and raise the latter, as disclosed in detail in the co-pending application of Robert L. Rhode and John A. Benkovich, Serial No. 811,933, filed May 8, 1959, entitled "Electric Can Opener." Provision also may be there made for causing the position of the blade support first to close an electric circuit to the motor 20 to start the motor, and then, independently of the operating handle 17 and influenced by cessation of resistance to cutting, to stop the motor, while the can is still supported by the turning wheel and cutter blade, such expedients forming no part of the present invention but reference being made to said co-pending application for a description thereof. Motor 20 for the device is shown supported in the housing 11 by brackets 21 which are attached by legs 22 on the inner face of the housing. The front face of the housing may be a die casting, as shown in said pending application, and integrally provide certain bearing and support parts.

Turning now to the expedients of the present invention, the output shaft 23 of the motor 20 has fixed thereon a relatively small pulley 24. Intermediately disposed between the can turning wheel shaft 12 and the motor output shaft 23 is an intermediate or idler shaft 25 that is rigidly fixed in a boss 25a that may be formed as an integral part of the front wall of the housing 11 that also carries the motor support legs 22. A pinion 28 is affixed to a relatively large pulley 26, and this assembly is journaled for rotation upon shaft 25, being retained in position by a spring washer 25a and felt lubricating washer 25b. Mutually entrained on the pulleys 24 and 26 is the drive belt 27. In the exemplary embodiment of the invention illustrated in the drawing, the drive belt 27 is shown of circular cross-section, this form being preferred, but it will be understood that other forms of belt may be employed, as, for example, V-belts or flat belts.

A relatively large driven spur gear 29 that is fixed on the can turning wheel shaft 12 on the inside of the housing meshes with and is driven by pinion 28. Gear 29 may be about the same diameter as pulley 26, but it will be understood that the gear and pulley sizes selected will depend upon motor characteristics, the desired speed of rotation of can turning wheel 13, and other considerations.

Desirably, the can opener is made as small as possible consistent with its use. It has been found possible to use the belt drive, even in the close quarters of the housing, by reason of the high speed, low torque conditions under which the first stage of the transmission operates, without slippage or appreciable loss of power. The high frequency, noise producing impact of gear teeth is thus avoided. At the same time, the positive gear drive of the second stage of the transmission where low speed and high torque conditions are met assures transfer of power without slippage.

Preferably, from the cost, weight and volume standpoint, motor 20 is of the shaded pole type and belt 27 is somewhat elastic as well as flexible. A suitable belt is one of solid rubber which is round in cross section, as illustrated in the drawing. When the motor is energized by the closing of the can opener switch, it does not turn pulley 26 coincidentally with the initial turning of drive pulley 24 because the elasticity of belt 27 permits it to stretch slightly as the motor starts and turns pulley 24 and before the driven pulley 26 and the rest of the can opener mechanism starts moving. Thus, the heavy load involved in the initial piercing of the lid of the can is not immediately applied to the motor on starting, and because the torque applied by the shaded pole type motor to its drive shaft very rapidly increases with the speed of the shaft, the result is that a relatively small shaded pole type motor may successfully be used to drive the can opener. The action of the elastic belt 25 in thus easing the load on the motor may be described as a clutching action in that the motor is started running before the load of the apparatus is applied.

In order to serve in the manner described, it is necessary that the physical properties and the dimensions of the belt 27 be such as to efficiently and reliably transmit the power necessary for the operation of the apparatus and also serve the clutching function. As a specific example of a suitable belt, a can opener of the type shown provided with a shaded pole type of motor rated at 1/20 horsepower and operated at a speed of approximately 3400 r.p.m. may employ a solid rubber belt having a round cross section of 0.139 inch in diameter. The elastic character should be such that a load of two pounds applied to a single strand of the belt material results in an elongation of 25%.

Constructed and arranged as herein described and shown, a speed reduction power transmission for an electric can opener or the like is disclosed. While noise otherwise caused by a gear drive in the first stage is satisfactorily eliminated by use of the friction type belt drive, it has been discovered that a positive drive, as here represented by the pinion and driven gear arrangement 28—29, may be employed to meet the conditions of low speed and high torque of the second stage of power transmission without objectionable noise, it having been found that under these conditions the gears do not generate objectionable noise. These discoveries have made it possible to construct an electric can opener with satisfactory cutting characteristics without objectionably noisy operation. While a gear-and-pinion positive drive has been here shown in the second stage, other positive drives might be employed in said second stage such as a chain-and-sprocket arrangement.

Invention is claimed as follows:

1. In a can opener having a housing including a vertically extending main frame, a can cutting blade secured to said frame, a motor mounted in said housing, a first pulley attached to the shaft of said motor, a can turning wheel mounted adjacent said blade outwardly of said housing and operable at low speed and high torque, a second pulley positively engaged with said can turning wheel, said first and second pulleys being within said housing, and a flexible belt entrained on said first and second pulleys, the improvement wherein said motor is a high speed shaded pole type motor having a low starting torque, said belt is longitudinally resilient for permitting said motor to start up without slippage between said first pulley and said belt at a low torque due to the initial clutching action produced by the stretching of said belt upon the starting of the rotation of said first pulley by said motor, and said motor and pulleys are supported upon said main frame in generally vertical alignment.

2. In the combination of claim 1, said belt further having a longitudinal resiliency of twenty-five percent under a longitudinally applied load of two pounds.

References Cited in the file of this patent

UNITED STATES PATENTS

| | | |
|---|---|---|
| 1,252,550 | Champney | Jan. 8, 1918 |
| 1,555,150 | Oswald | Sept. 29, 1925 |
| 1,645,887 | Wittel | Oct. 18, 1927 |
| 2,028,282 | Hoe | Jan. 21, 1936 |
| 2,506,514 | McKelvey | May 2, 1950 |
| 2,711,580 | Conway | June 28, 1955 |
| 2,897,589 | Bodle | Aug. 4, 1959 |
| 2,903,899 | Bade | Sept. 15, 1959 |
| 2,903,974 | Smith | Sept. 15, 1959 |